May 29, 1928.  
W. W. HICKS ET AL  
1,671,584  
ELECTRIC HEATING SYSTEM  
Filed May 10, 1926
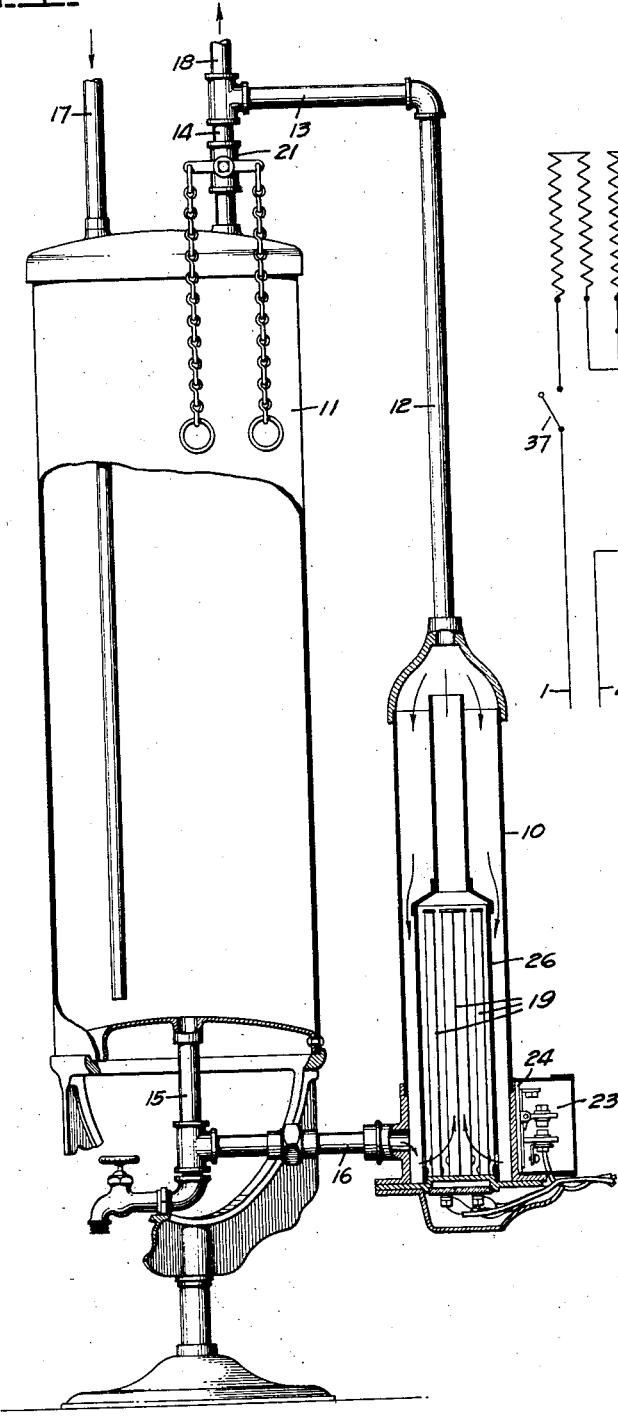
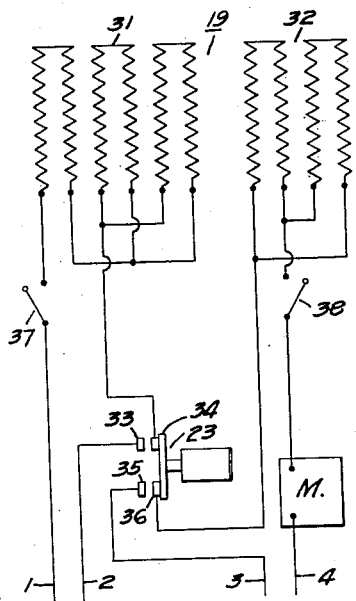
INVENTORS  
HARRY V. MOONEY  
WM. WESLEY HICKS  
BY White Prost  
their ATTORNEYS Patented May 29, 1928.

1,671,584

UNITED STATES PATENT OFFICE.

WILLIAM WESLEY HICKS, OF SAN FRANCISCO, CALIFORNIA, AND HARRY V. MOONEY, OF SEATTLE, WASHINGTON.

ELECTRIC HEATING SYSTEM.

Application filed May 10, 1926. Serial No. 108,034.

This invention relates generally to electrical heating systems and is particularly applicable to household hot water or other liquid heating systems.

It is customary in this country for electrical power companies to supply current over both unmetered and metered lines. Current supplied over unmetered lines is paid for on a flat rate basis, such lines being known as flat rate lines, and the charge being based upon the maximum power load which the consumers' equipment is capable of placing on the line. Current supplied thru metered lines is of course paid for in accordance with the actual power consumption. Domestic consumers usually operate their heating equipment upon a flat rate line but use a metered line for lights and other electrical devices of small wattage. With heating equipment it is often desirable to temporarily employ a current consumption which is greater than that for which the apparatus is rated under the flat rate basis. If the apparatus is given a rating based upon this load, then the cost will be excessive, compared to the actual average increase in power consumption. For example, in domestic hot water heaters it is desirable to occasionally be able to heat a large quantity of water in a short period. If the heater is arranged so that a large number of heating elements may be connected to the flat rate line then it will be given a rating corresponding to this occasional or abnormal load.

It is an object of this invention to devise a heating system which will normally operate upon a flat rate or unmetered line but which will have an auxiliary heating resistance which may be connected to a metered line.

It is a further object of this invention to operate the main heating resistance of a liquid heating system from an unmetered line with a thermostatically controlled switch and to employ the same switch to control an auxiliary heating resistance supplied from a metered line.

Further objects of this invention will appear from the following description in which we have set forth the preferred embodiment of our invention. It is to be understood that the scope of the invention is to be determined from the appended claims and the state of the prior art.

Referring to the drawings:

Figure 1 shows a suitable form of liquid heater with which the system of this invention has been incorporated.

Fig. 2 is a circuit diagram showing the connections for the system of this invention.

While the system of this invention is applicable to any heating apparatus it has been shown as incorporated with a liquid heater such as disclosed in the patent application filed in the name of Kercher and Hicks, No. 712,434 on May 10, 1924. Such a heater comprises generally a pair of storage tanks 10 and 11 having their upper portions connected by pipes 12, 13 and 14, and their lower portions in communication thru pipes 15 and 16. Communication is established with a supply of cold water or other liquid thru pipe 17 which discharges near the bottom of the tank 11. Heated liquid may be withdrawn from the apparatus thru pipe 18 which is connected to faucets or other outlets. The liquid within the tank 10 is heated by electrical heating means 19 whereby a thermal circulation may be set up between the tanks 10 and 11 to store heated liquid in the upper portion of the tank 11.

A manually operated valve 21 may be inserted in the pipe 14 whereby by manipulation of this valve heated liquid may be either withdrawn directly from the tank 10 to the exclusion of tank 11, or may be withdrawn from the tank 11 while circulation is being permitted between the tanks. Preferably the volumetric capacity of tank 10 is made relatively smaller than that of tank 11 so that when only small quantities of water are desired the valve 21 may be turned to close the pipe 14 thus interrupting circulation between the tanks and causing water to be withdrawn directly from tank 10. When it is desired to store larger quantities of heated liquid valve 21 is opened, thus permitting circulation between the tanks to store heated liquid in the tank 11. The current supplied to the electrical heating means 19 is preferably automatically controlled by means of a switch 23 which in turn is actuated by a thermostatic element 24, this element being in thermal contact with the liquid in the lower portion of the tank 10. In order to insure the storage of heated liquid in the upper portion of the tank 10 a hollow column 26 may be positioned within the tank 10 with its lower portion surrounding the heating means 19 whereby the interior of the tank 10 is divided into a plurality of vertical passageways.

With apparatus such as described above the heating means is usually connected to an unmetered or flat rate line in series with the thermostatically controlled switch. It is often desirable to be able to heat large quantities of liquid within a short time by increasing the current consumption of the heating means. If this is accomplished by increasing the number of heating elements so as to increase the total current consumption then the rating of the system will be in accordance with this unusual or peak load and will accordingly be relatively high compared to the actual average amount of power consumed. In this invention it is proposed to provide an auxiliary heating resistance which is supplied from a metered line and which may be operated together with the main heating resistance to take care of unusual loads. By this method the maximum rating of the heating system will not be increased so that the flat rate will be the same, while the excess power consumed for short intervals will be paid for in accordance with the reading of the meter.

Thus as shown in the circuit diagram of Fig. 2 the electrical heating means 19 is divided up into two heating resistances 31 and 32 which are supplied respectively from the flat rate or unmetered lines 1 and 2, and the metered lines 3 and 4. The current supplied to both heating resistances is automatically controlled from the thermostatically operated switch 23 which is preferably provided with two sets of contacts, contacts 33 and 34 being connected in series with line 2 of the unmetered lines, while contacts 35 and 36 are connected in series with line 3 of the metered lines. Switch 37 is inserted in the circuit for the main heating resistances 31 in order to initiate the operation of the heater. When it is desired to heat a large quantity of water or other liquid in a short time switch 38 in the metered circuit may be closed in addition to the switch 37 so that the heating resistance 32 may be also operated in addition to resistance 31. This condition may correspond for example to periods when the valve 21 is opened to permit circulation between the tanks 10 and 11 and storage of heated liquid in the tank 11.

We claim:

1. In an electrical liquid heating system, a heating resistance supplied from an unmetered line, another heating resistance supplied from a metered line, and thermostatically controlled switch means for controlling the respective circuits supplying both heating resistances.

2. In an electrical liquid heating system, a liquid storage tank, a main heating resistance cooperatively associated with said tank and supplied from an unmetered flat rate line, an auxiliary heating resistance cooperatively associated with said tank and supplied from a separate metered line, a manually controlled switch for interrupting the current supplied to said auxiliary resistance, and a temperature controlled switch cooperatively associated with the tank for controlling the current supplied to the main resistance.

3. In an electrical liquid heating system, a liquid storage tank, a heating resistance cooperatively associated with the tank and supplied from one current supply line, another separate heating resistance cooperatively associated with the tank and supplied from another current supply line, a manually controlled switch for controlling current supplied to one of said resistances, and a temperature controlled switch cooperatively associated with the tank for automatically controlling the other of said resistances.

4. In an electrical liquid heating system, two independent heating resistances, a separate current supply circuit for each heating resistance, a manually controlled switch in at least one of said circuits, and an automatic temperature responsive switch means adapted to simultaneously make or break connections in both of said supply circuits.

In testimony whereof, we have hereunto set our hands.

WILLIAM WESLEY HICKS.
HARRY V. MOONEY.